(12) United States Patent
Lamperth et al.

(10) Patent No.: US 10,160,026 B2
(45) Date of Patent: Dec. 25, 2018

(54) VARIABLE PITCH PUNCH APPARATUS

(71) Applicant: GKN EVO EDRIVE SYSTEMS LIMITED, Redditch, Worcestershire (GB)

(72) Inventors: Michael Ulrich Lamperth, Surrey (GB); Mark Cordner, Surrey (GB)

(73) Assignee: GKN EVO EDRIVE SYSTEMS LIMITED, Worcestershire (GB)

( * ) Notice: Subject to any disclaimer, the term of this patent is extended or adjusted under 35 U.S.C. 154(b) by 202 days.

(21) Appl. No.: 14/914,436

(22) PCT Filed: Aug. 13, 2014

(86) PCT No.: PCT/GB2014/052467
§ 371 (c)(1),
(2) Date: Feb. 25, 2016

(87) PCT Pub. No.: WO2015/028778
PCT Pub. Date: Mar. 5, 2015

(65) Prior Publication Data
US 2016/0303636 A1  Oct. 20, 2016

(30) Foreign Application Priority Data
Aug. 28, 2013 (GB) .................................. 1315324.2

(51) Int. Cl.
*B21D 3/00* (2006.01)
*B21D 28/36* (2006.01)
*H02K 15/02* (2006.01)

(52) U.S. Cl.
CPC ............. *B21D 28/36* (2013.01); *H02K 15/02* (2013.01)

(58) Field of Classification Search
CPC .......... B26D 7/1818; B26F 1/10; B26F 1/384; Y10T 83/937; Y10T 83/9387
See application file for complete search history.

(56) References Cited

U.S. PATENT DOCUMENTS

| | | | |
|---|---|---|---|
| 3,943,809 A | 3/1976 | Schoppee | |
| 4,403,489 A | 9/1983 | Munsterman et al. | |
| 5,040,397 A * | 8/1991 | Bodnar ................. | B21D 28/36 72/190 |
| 5,363,728 A * | 11/1994 | Elsner ...................... | B26D 7/08 83/116 |
| 5,429,573 A * | 7/1995 | Jahnke ................... | B21D 28/36 29/426.5 |

(Continued)

FOREIGN PATENT DOCUMENTS

| | | |
|---|---|---|
| DE | 198 32 897 | 1/2000 |
| EP | 2 042 279 | 4/2009 |

(Continued)

*Primary Examiner* — Minh Trinh
(74) *Attorney, Agent, or Firm* — Pepper Hamilton LLP

(57) ABSTRACT

A variable pitch punch apparatus (1) for punching holes in material. The apparatus comprises a rotary punch head (2) comprising at least one punch member (4a-c) to punch at least one hole in a material at least one desired location. The apparatus (1) further comprises a die head (6) comprising at least one die (7) corresponding to said punch member (4a-c). The apparatus (1) further comprises an actuator for providing a selective relative speed difference between the material and the rotary punch head (2).

7 Claims, 2 Drawing Sheets

(56) References Cited

U.S. PATENT DOCUMENTS

| | | | | |
|---|---|---|---|---|
| 5,887,502 A * | 3/1999 | Yamaguchi | ............ | B26D 1/626 83/164 |
| 6,354,180 B1 | 3/2002 | Hill | | |
| 6,725,751 B1 * | 4/2004 | Surina | .................... | B21D 28/36 83/49 |
| 2006/0027066 A1 * | 2/2006 | Jensen | ................... | B21D 28/26 83/30 |
| 2016/0303636 A1 * | 10/2016 | Lamperth | .............. | B21D 28/36 |

FOREIGN PATENT DOCUMENTS

| | | |
|---|---|---|
| EP | 2 487 014 | 8/2012 |
| JP | S56-88655 | 7/1981 |

* cited by examiner

VARIABLE PITCH PUNCH APPARATUS

CROSS-REFERENCE TO RELATED APPLICATIONS

This application is a national phase filing of International Patent Application No. PCT/GB2014/052467, filed on Aug. 13, 2014, which claims priority to Great Britain Patent Application No. 1315324.2, filed on Aug. 28, 2013, both entitled "VARIABLE PITCH PUNCH APPARATUS," the contents of which are herein included by reference in their entirety.

The present invention relates to a method and a variable pitch punch apparatus for punching holes through a material, such as for example steel. The present invention also relates to a method for preparing a laminated steel stator cores for axial-flux machines.

BACKGROUND OF THE INVENTION

Conventional processes for punching holes through a material typically involve feeding the material, for example steel, into a punch apparatus until the material is in the desired position. The feed of the material is then stopped and the punch apparatus is then operated to form the hole. The process is then repeated until all of the desired holes have been produced in the predetermined locations with the required spacing between adjacent holes along the length of the material.

The process is therefore time consuming and requires the spacing between each punched hole to be accurately measured and the position of the material within the apparatus to be adjusted accordingly. The process becomes particularly complex and time consuming when the punch apparatus is being used to form irregular punching patterns along the length of the material.

SUMMARY OF THE INVENTION

According to a first aspect, the present invention provides a variable pitch punch apparatus for punching holes in material, the apparatus comprising:
  a rotary punch head comprising at least one punch member to punch at least one hole in a material at at least one desired location;
  a die head comprising at least one die corresponding to said punch member; and
  an actuator for providing a selective relative speed difference between the material and the rotary punch head.

According to a second aspect, the present invention provides a method for punching holes in material, the method comprising:
  feeding a material at a desired feed rate into a punch apparatus as herein described;
  operating the rotary punch head to punch member at least one hole in the material at the desired location; and
  operating an actuator to allow a selective relative speed difference between the material and the rotary punch head.

According to a further aspect, the present invention provides a method of preparing a laminated steel stator core, the method comprising:
  feeding steel at a desired feed rate into a punch apparatus as herein described;
  operating the rotary punch head to punch at least one hole in the steel at the desired location;
  operating an actuator to allow a selective relative speed difference between the material and the rotary punch head; and
  coiling the steel to provide the laminated steel stator core.

The actuator may be arranged to selectively vary the rotary speed of the rotary punch head relative to the material. The actuator may be arranged to selectively vary the material feed rate between punching operations. The selective variation of the rotary speed of the punch head and the material feed rate may be provided by a single actuator. Alternatively the apparatus may comprise a first actuator for selectively varying the rotary speed of the rotary punch head and a second actuator for selectively varying the material feed rate.

The die head may be a rotary die head.

The rotary punch head may comprise a punch shaft with a plurality of spaced apart punches arranged around the periphery of the punch shaft. For example, the rotary punch head may comprise three mutually spaced apart punch members arranged around the periphery of the punch shaft. The shaft may comprise a plurality of peripheral portions extending between adjacent punch members. The radius of at least one peripheral portion as measured relative to the centre of rotation of the punch shaft may vary along the length of the at least one peripheral portion. The length of the peripheral portion may be understood to be measured along the circumference or periphery of the portion.

The radius of the at least one peripheral portion of the punch shaft, as measured relative to the centre of rotation of the punch shaft, may decrease with distance from the nearest punch member to a minimum value located between the adjacent punches. The minimum radius of the at least one peripheral portion may be located in a central region, for example substantially centrally, of the peripheral portion between the adjacent punch members.

The punch shaft may have any suitable cross-section. The punch shaft may for example have a substantially elliptical cross-section.

At least part of at least one peripheral portion of the punch shaft may be arranged in use to not contact the material. Preferably, substantially all of at least one peripheral portion of the punch shaft is arranged in use to not contact the material. For example, all of the peripheral portions of the punch shaft are arranged in use to not contact the material.

The punch shaft may further comprise a coating of at least one low friction material. Preferably, at least one peripheral portion of the punch shaft comprises a coating of at least one low friction material.

At least one peripheral portion of the punch shaft preferably comprises at least one rotating bearing element arranged to contact the material.

The presence of a coating of at least one low friction material and/or rotating bearing element(s) on the peripheral portion(s) of the punch shaft which are arranged to come into contact with the material enables relative motion, for example slipping motion, to be provided between the punch head, in particular the punch shaft, and the material to be punched. The relative motion, for example slipping motion, between the punch head and the material provides the relative speed difference.

The material may be any suitable material such as for example metals, preferably steel.

The laminated steel stator core may for example be used in axial-flux electric machines.

Variation of the punch head's rotary speed and/or the feed rate of the material to be punched can be achieved using any suitable technique. For example, the rotary speed and the position of the punch head's rotary parts may be controlled using toothed transmission components, such as for example gears, timing belts, chains or similar. The apparatus may further comprise any suitable position, speed and/or acceleration control methods in order to achieve the necessary relative motion between punching operations.

The punch apparatus may be used to provide regular or irregular punching patterns in the material. For example, the punch apparatus may be arranged to provide constant or variable spacing between subsequent punched holes. For example, the punch apparatus may be arranged to provide a constant or variable speed of rotation between punching operations.

According to a further aspect, the present invention provides a variable pitch punch apparatus for punching holes in a material, the apparatus comprising a rotary punch head having a body, and a punch member, the body defining an axis of rotation and having an external surface which extends from a first radius from the axis to a second radius from the axis, the second radius being larger than the first radius, wherein the punch member extends radially out of the external surface of the body at at least that portion of the external surface having the second radius.

BRIEF DESCRIPTION OF DRAWINGS

FIG. 2A illustrates the punching frequency of the punch apparatus during manufacture of the inside diameter of the component; FIG. 2B illustrates the punching frequency of the punch apparatus during manufacture of the mid-radius of the component; and FIG. 2C illustrates the punching frequency of the punch apparatus during manufacture of the outer diameter of the component.

DETAILED DESCRIPTION OF THE PREFERRED EMBODIMENTS

Figure 1:
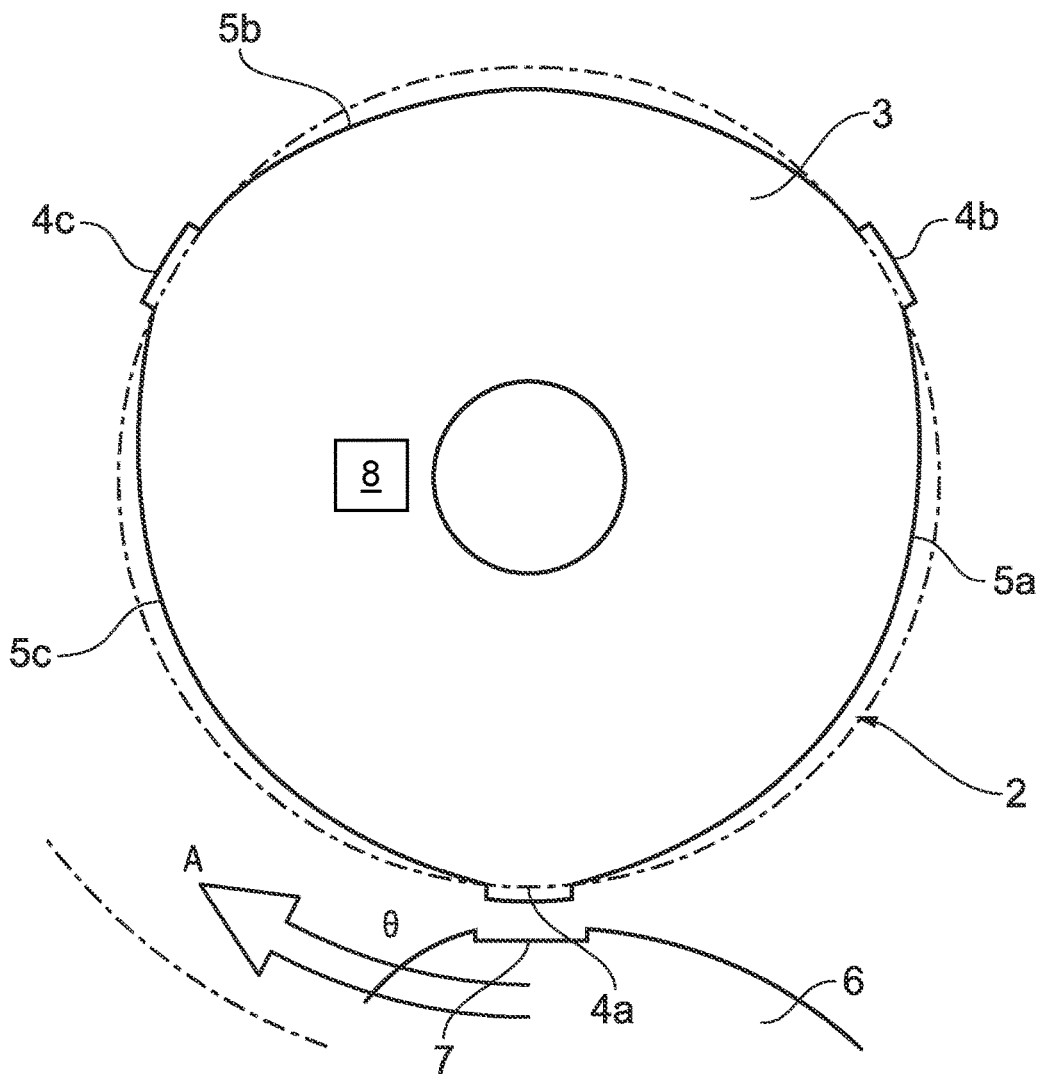
FIG. 1 is a schematic illustration of the variable pitch punching apparatus according to one embodiment of the present invention.

FIG. 1 illustrates the variable pitch punch apparatus 1 of one embodiment of the present invention. The apparatus 1 comprises a rotary punch head 2 rotatable in the direction of arrow A. The rotary punch head 2 comprises a punch shaft 3 comprising three mutually spaced apart punch members 4a,4b,4c. Although FIG. 1 illustrates the rotary punch head 2 as having three punch members 4a-c it is to be understood that the rotary punch head 2 may comprise any suitable number of punch members 4a-c.

The punch members 4a-c may have any suitable shape depending on the desired shape of the holes required in the punched material. For example, the punch members 4a-c may have a circular, square or rectangular cross-section. The punch members 4a-c in FIG. 1 have a substantially rectangular cross-section.

The punch shaft 3 has a substantially elliptical cross-section. It is to be understood that although FIG. 1 illustrates the punch shaft 3 as having a substantially elliptical cross-section that the punch shaft may have any other suitable cross-section.

Three peripheral portions 5a,5b,5c extend between adjacent punch members 4a-c. FIG. 1 illustrates that the radius of the peripheral portions 5a-c as measured relative to the centre of rotation of the punch shaft 3 varies along the length of the peripheral portions 5a-c. The length of the peripheral portion(s) is measured in a direction along the circumference or periphery of the portion 5a-c. The radius of the peripheral portions 5a-c decreases to a minimum value towards the central region of the peripheral portion 5a-c between adjacent punch members 4a-c. The maximum radius of the peripheral portions 5a-c is located adjacent the punch members 4a-c.

The apparatus 1 further comprises a rotary die head 6 providing a plurality of dies 7. Although FIG. 1 only illustrates a portion of the rotary die head 6 comprising a single die 7 it is to be understood that the rotary die head 6 comprises a plurality of dies 7. The dies 7 are shaped and dimensioned to receive a punch member 4a-c of the punch head 2. The dies 7 therefore have a substantially rectangular cross-section to correspond to the shape of the punch member 4a-c. The rotary die head 6 has a substantially circular cross-section.

In use, material to be punched, such as for example sheet steel, is inserted in a direction between the rotary punch head 2 and the rotary die head 6. The feed rate of the sheet steel may be controlled by any conventional method.

An actuator 8 causes the rotary punch head 2 to rotate in the direction of arrow A at a first pre-determined speed and the rotary die head 6 rotates in the opposite direction. Rotation of the rotary punch head 2 causes punch member 4a to be aligned with die 7 and the rotary punch head 2 punches a hole in the material in a predetermined location.

As the rotary punch head 2 continues to rotate, the peripheral portion 5a extends adjacent the die head 6. The peripheral portions 5a-c are arranged to not contact the die head 6 between punching operations. As a result, a relative speed difference is introduced between the punch head and the steel. Any suitable position, speed and/or acceleration control methods can be used in order to achieve the necessary relative motion between the punching operations.

As the rotary punch head 2 rotates such that the peripheral portions 5a-c are located adjacent the die head the speed of the rotary punch head 2 increases and therefore introduces a speed difference between the punch head and the steel.

Although, the embodiment shown in FIG. 1 is arranged such that the peripheral portions 5a-c are arranged to not contact the die head it is to be understood that in other embodiments the punch head provides peripheral surfaces with reduced friction, such as for example with a low friction coating or a rotating bearing element, in order to enable the punch head to slip relative to the material in order to provide the relative speed difference.

Figure 2:
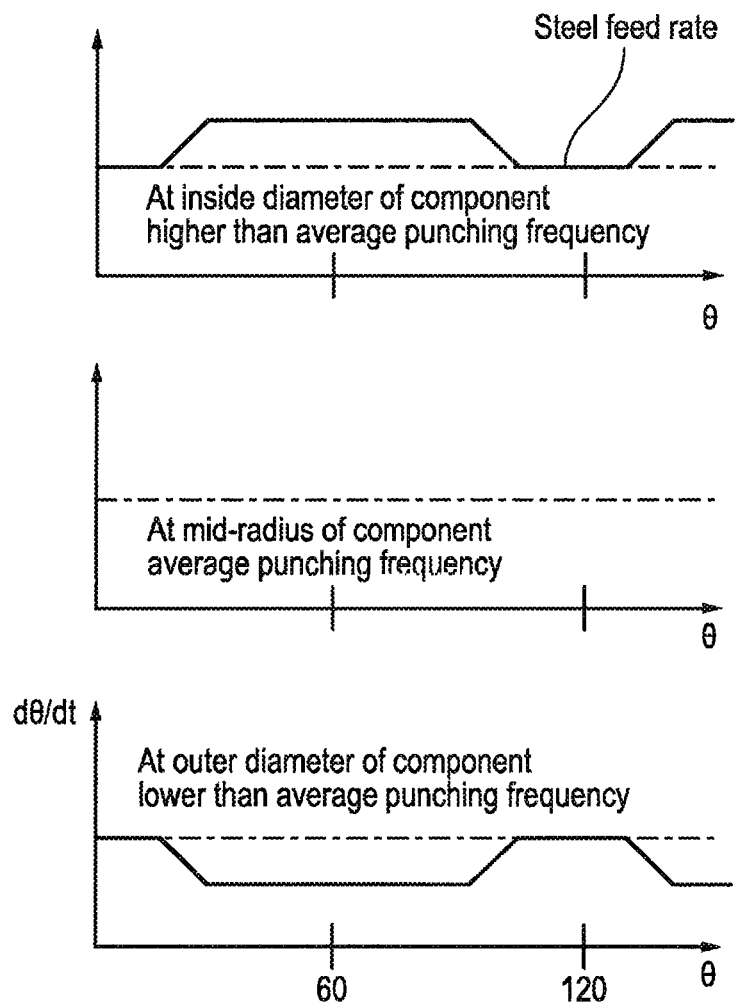
FIGS. 2A-2C are graphs illustrating the variation in the punching frequency of the variable pitch punch apparatus according to an embodiment of the invention during the manufacture of a laminated steel stator coil.

FIGS. 2A-C illustrate the punching frequency of the punch apparatus during the manufacture of a component, such as for example a laminate steel stator core. As shown in FIG. 2A during the manufacture of the inside surface of the component, the punch apparatus 1 provides for a higher than average punching frequency. The punching frequency is greater than the steel feed rate. During the manufacture of the mid-radius part of the component, the punch apparatus 1 operates at an average punching frequency which is substantially equal to the steel feed rate (FIG. 2B). During the manufacture of the outer diameter of the component, the punch apparatus 1 operates at a punching frequency which is less than the average punching frequency. The punching frequency is lower than the steel feed rate.

As a result, the apparatus is arranged such that the holes punched on the material corresponding to the inside surface of the component are located closer together than the holes punched on the material corresponding to the mid-radius part of the component. Furthermore, the holes punched on the material corresponding to the mid-radius part of the component are located closer together than the holes punched on the material corresponding to the outer diameter of the component. Therefore, when the punched material is coiled to provide the stator coil, the holes are aligned within each layer of the laminate to provide slot profiles extending radially inwardly from the outer surface towards the inside surface of the component.

Although aspects of the invention have been described with reference to the embodiment shown in the accompanying drawings, it is to be understood that the invention is not limited to the precise embodiment shown and that various changes and modifications may be effected without further inventive skill and effort.

What is claimed is:

1. A variable pitch punch apparatus for punching holes in material, the apparatus comprising:
    a rotary punch head comprising a punch shaft having a center of rotation, and having a plurality of spaced apart punch members to punch respective holes in a material at respective desired locations, the punch shaft also having a plurality of peripheral portions extending between adjacent punch members, the peripheral portions having respective radii measured relative to the center of rotation of the punch shaft, wherein the radii vary along the length of the peripheral portions such that the respective radii of the peripheral portions decrease with distance from a nearest punch member to a minimum value located between the adjacent punch members;
    a rotary die head adjacent the rotary punch head, and comprising a plurality of dies corresponding to respective punch members of the rotary punch head; and
    an actuator for rotating the rotary punch head in a first direction at a first predetermined speed, and for rotating the rotary die head in a second direction opposite to the first, such that respective punch members are aligned with respective dies, the peripheral portions of the punch head configured to allow a selective relative speed difference between the rotary punch head and material located between the rotary punch head and rotary die.

2. The punch apparatus as claimed in claim 1, in which the minimum radii of each of the peripheral portions is located centrally between respective adjacent punch members.

3. The punch apparatus as claimed in claim 1, wherein the punch shaft has a substantially elliptical cross-section.

4. The punch apparatus as claimed in claim 1, wherein at least one of the plurality of peripheral portions of the punch shaft comprises a coating of at least one low friction material.

5. The punch apparatus as claimed in claim 1, wherein at least one of the plurality of the peripheral portions of the punch shaft comprises at least one rotating bearing element arranged to contact the material.

6. The punch apparatus as claimed in claim 1, wherein at least part of at least one of the plurality of peripheral portions of the punch shaft is arranged such that it does not contact the material during use.

7. The punch apparatus as claimed in claim 6, wherein substantially all of the plurality of peripheral portions of the punch shaft are arranged such that they do not contact the material during use.

* * * * *